United States Patent [19]

König

[11] Patent Number: 5,158,785
[45] Date of Patent: Oct. 27, 1992

[54] APPARATUS FOR KNEADING PORTIONED DOUGH PIECES

[76] Inventor: Helmut König, A-8045 Graz, Statteggerstrasse 80, Austria

[21] Appl. No.: 576,399
[22] PCT Filed: Oct. 31, 1989
[86] PCT No.: PCT/AT89/00096
   § 371 Date: Sep. 13, 1990
   § 102(e) Date: Sep. 13, 1990
[87] PCT Pub. No.: WO90/06683
   PCT Pub. Date: Jun. 28, 1990

[30] Foreign Application Priority Data

Dec. 20, 1988 [AT] Austria .................. 3108/88

[51] Int. Cl.⁵ .................................... B29C 43/08
[52] U.S. Cl. ............................. 425/233; 99/462; 425/236; 425/335; 425/373
[58] Field of Search ........... 425/373, 200, 209, 364 R, 425/335, 236, 233, 100; 99/462

[56] References Cited

U.S. PATENT DOCUMENTS

| | | | |
|---|---|---|---|
| 1,960,367 | 5/1934 | Bellingroth | 425/100 |
| 2,812,729 | 11/1957 | Bahlsen | 425/373 X |
| 2,961,735 | 11/1960 | Mohring | 425/373 X |
| 3,689,280 | 9/1972 | Werner | 425/373 X |
| 4,768,942 | 9/1988 | Sola | 425/233 |

FOREIGN PATENT DOCUMENTS 363411 8/1981 Austria .
2462915 10/1984 Fed. Rep. of Germany .

*Primary Examiner*—Richard L. Chiesa
*Attorney, Agent, or Firm*—Remy J. VanOphem

[57] ABSTRACT

An apparatus for portioning and kneading pieces of dough has a rotatably mounted drum driven for continuous rotational movement and provided with a plurality of receiving openings for the dough to be kneaded. Disposed above the drum is a kneading tool formed by an endless band guided over two guide rollers, however, spaced apart a predetermined distance from the periphery of the drum. The band is mounted on a support member which is shiftably supported on a profiled shaft in the longitudinal direction thereof and is driven to a reciprocating movement. The band carries out a circular movement for carrying out the kneading process on the dough pieces positioned in the receiving openings. Since the band moves with the drum, a long period of time is available to carry out the kneading process.

22 Claims, 3 Drawing Sheets

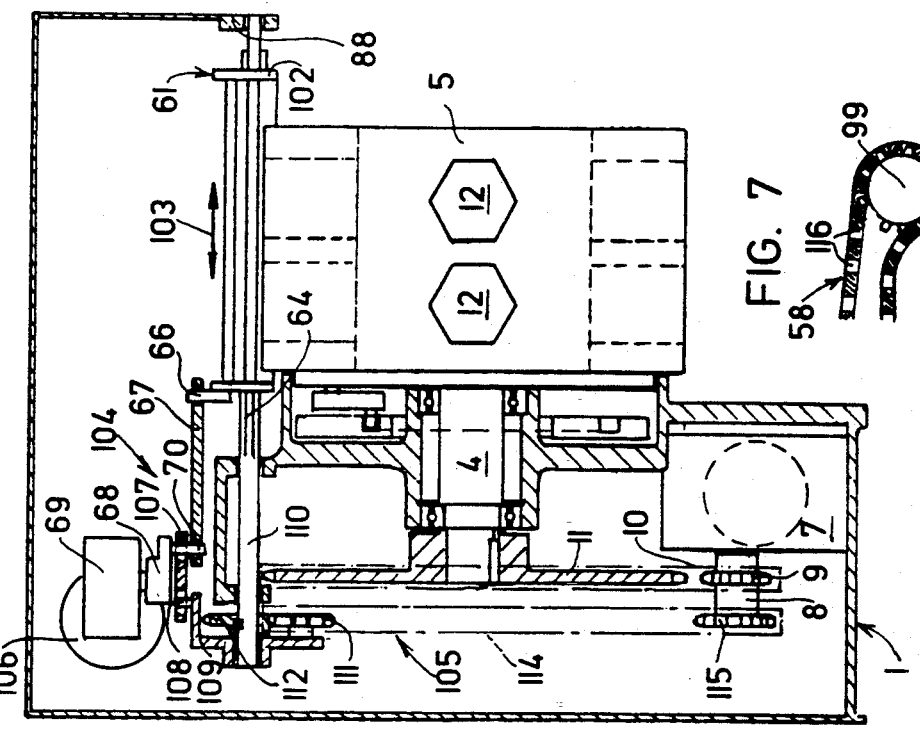
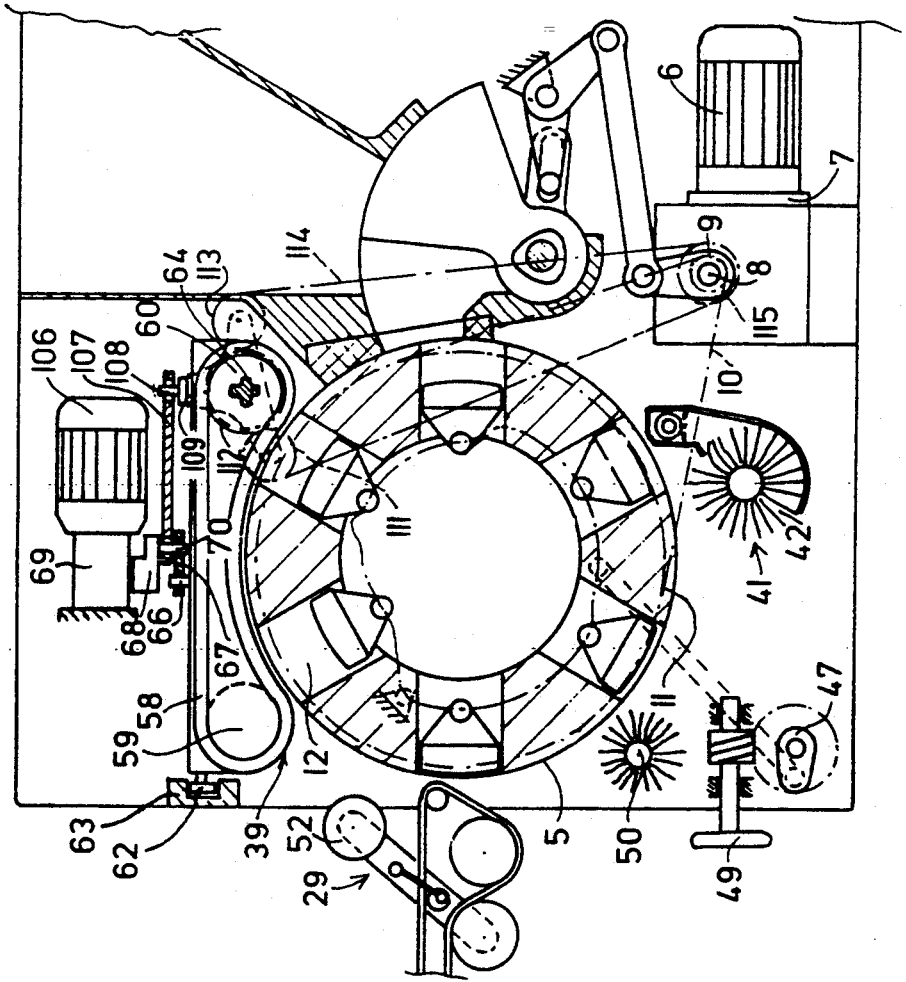

APPARATUS FOR KNEADING PORTIONED DOUGH PIECES

BACKGROUND OF THE INVENTION

1. Field of the Invention

The invention relates to an apparatus for kneading of portioned dough pieces. The apparatus has a frame in which a drum is bearingly supported which continuously rotates around a horizontal axis, and which is provided on its periphery with receiving openings for the dough pieces. A kneading tool is bearingly supported on a carrier member which preferably is disposed above the drum, which kneading tool is provided with a recess which during the kneading process executes a circular movement relative to the neighboring receiving opening and in addition to this movement is taken along with the peripheral movement of the drum during the kneading process.

2. Description of the Prior Art

In a known apparatus disclosed in U.S. Pat. No. 1,960,367, the kneading tool is a plate carried by the carrier member which is formed as a swivel arm. The carrier member is swivelable around the axis of the drum and is swivelled together with the continuous movement of the drum from a starting position to an end position, the kneading process being effected during the swivel motion. As soon as the end position is reached, the swivel arm is led back again to its starting position under the action of a spring. Such an apparatus has the advantage that a relatively large amount of time is at the disposal for the kneading process so that the kneading result is sufficient. However, there is the disadvantage that the carrier member is primarily by impact returned to its starting position, with the result that disturbing machine noise is created, and impact-like stresses imparted to the machine may result in early wear or breakage of the elements. A further disadvantage is that a portion of the driving power of the machine is needed to tension the spring which after release returns the swivel arm back to its starting position, which means that a portion of the power expenditure is needlessly lost.

SUMMARY OF THE INVENTION

An object of the invention is to provide an improved apparatus wherein the known disadvantages of the prior art devices are avoided and the kneading result is maintained or even increased whereby the duration of life of the apparatus is substantially increased and machine noise is decreased when compared with the known prior art construction.

According to the present invention, the kneading tool is a band provided with a plurality of recesses, which band is driven for revolution in a direction of rotation of the drum so that one of its recesses is always disposed opposite to a receiving opening of the drum. The band is led over at least two deflecting points disposed on the carrier member and spaced apart from each other in a peripheral direction of the drum, preferably over guide pulleys, and is driven to a circular kneading motion of its recess relative to the receiving opening of the drum. The carrier member is slidably retained in the frame in a direction perpendicular to the running direction of the band. By the revolution motion of the band, a new recess of the band is presented for each subsequent receiving opening of the drum for effecting the kneading process without the requirement that the band has to be returned to its starting position as is necessary with the carrier of the prior art construction.

The respective effective recess of the band runs together with its cooperating receiving opening of the drum and executes relative to the receiving opening a circular motion necessary for the kneading process. The recess remains effective substantially until the band is guided over the subsequent deflecting point (as seen in a direction of rotation of the drum) and thereby the band with its recess is removed from the circumference of the drum. It is necessary to make the carrier member shiftable in a direction perpendicular to the axis of the drum or to the direction of movement of the band in order to allow the circular motion of the band.

According to the present invention, the circular motion could be achieved by making the carrier member of the band shiftable not only perpendicularly to the running direction of the band but also in this running direction, the two components of the movement completing each other to a circular movement of the carrier member and, therefore, of the band, by means of a suitable drive device. It is, however, according to the invention, more feasible for the carrier member to drive the band, in addition to its revolutionary motion, to a reciprocating movement superimposed to the revolutionary movement and directed in the same sense, and to drive the carrier member by a drive device to a reciprocating movement directed perpendicularly thereto. The reciprocating movement of the band completes the transverse shifting of the band caused by shifting the carrier member to the circular kneading movement of the band. In other words, in addition to the revolutionary movement of the band and to the movement of the band in a direction of the axis of the drum caused by the carrier member, a further movement of the band is superimposed which has as a consequence a slow down or an acceleration of the revolutionary movement of the band. The superimposed movement together with the movement of the band caused by the shifting displacement of the carrier member results in the circular kneading movement of the band.

The revolutionary movement of the band can be produced by driving at least one of the guide pulleys. In order to avoid slippage, it is, however, more favorable according to the invention to provide the band with a drive device, for example a row of perforations or a corrugation, or to connect the band to a member having a suitable drive device, for example to a linked chain. The drive device for effecting the revolutionary motion of the band is driven from a driving wheel, for example a pinion, disposed on the carrier and driven for rotation. Thereby the desired movement of the band is always ensured.

According to a further feature of the invention, in a particularly simple embodiment the pinion is disposed coaxially to one of the guide pulleys and preferably is driven therefrom.

Suitably the lower section of the band does not engage the circumference of the drum, but the band is guided spaced apart from the circumference of the drum by at least one link connected to the carrier member. This results in a careful treatment of the band. The distance may, but must not, be constant over the effective length of the band. The distance may increase with increasing duration of the kneading process in order to comply with the fact that with increasing duration of the kneading process more and more space is required because the shape of the dough piece is changed over to a ball.

The band may be a linked band composed of a plurality of plates, with the plates being provided on one side with cut-outs forming recesses. In order to keep weight to a minimum, the plates suitably are of lightweight metal, preferably aluminum. Always one recess may be provided on one plate. In order to facilitate the revolutionary movement of the band over the guide points, it is, however, suitable to keep the single plates comparatively narrow so that, as a rule, the cut-outs forming a common recess extend over more than one plate.

However, according to the invention, the band may also in an advantageous manner be a textile belt, preferably of synthetic plastic material, provided with recesses, which belt preferably is provided with a toothed system or a series of perforations for driving the belt from a toothed system of the driven guide roller.

Further objects and advantages of the invention will become more apparent from a reading of the detailed description thereof taken in conjunction with the drawings appended hereto.

BRIEF DESCRIPTION OF THE DRAWINGS

FIG. 4 is a sectional view of the band taken along line IV—IV of FIG. 3;

FIG. 5 is a vertical sectional view of a further embodiment of the apparatus taken perpendicularly to the axis of the drum;

FIG. 6 is a vertical sectional view through the axis of the drum according to FIG. 5; and FIG. 7 is a sectional view of the detail of the band according to the present invention.

DETAILED DESCRIPTION OF THE PREFERRED EMBODIMENT

Figure 1:
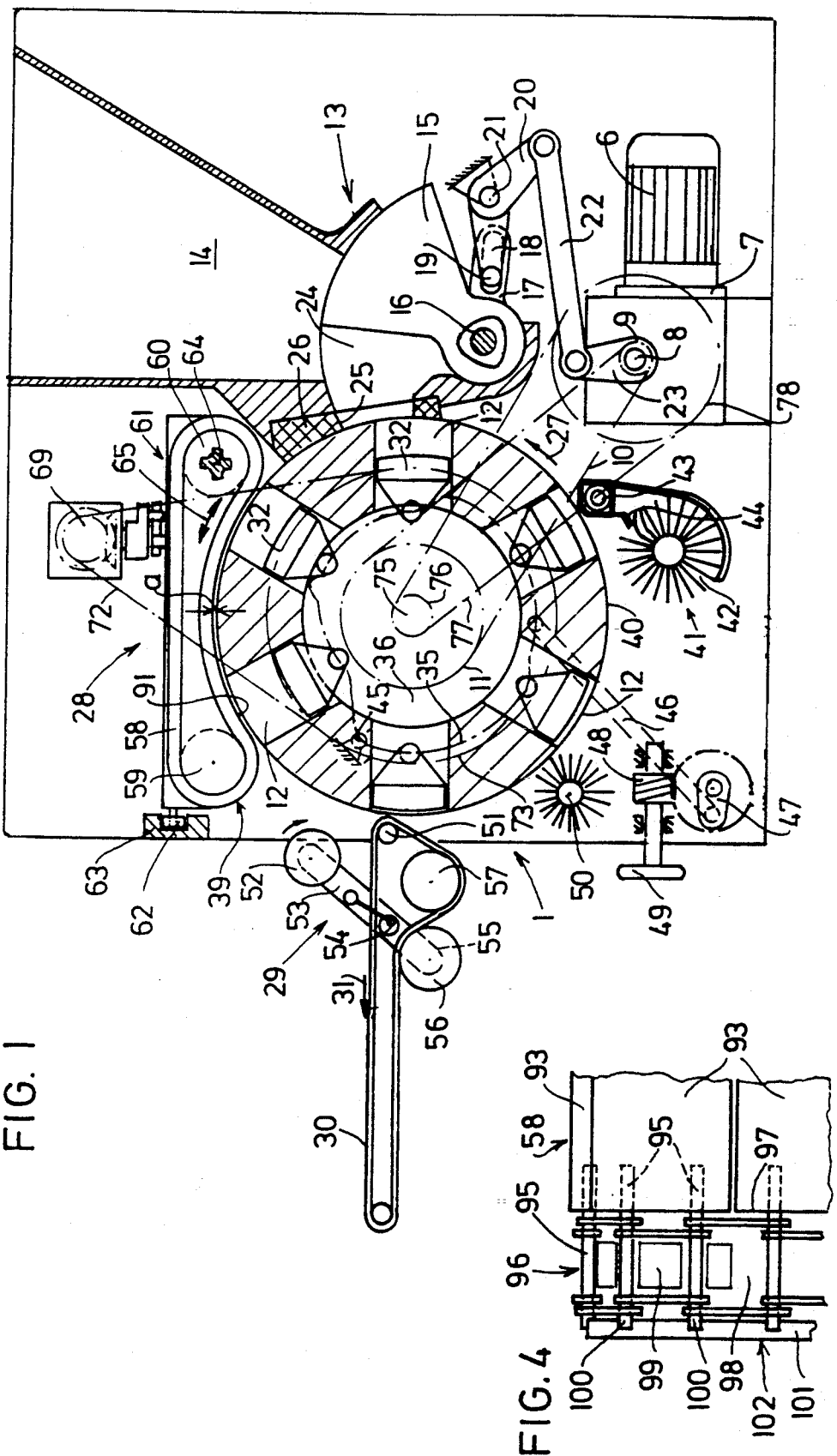
FIG. 1 illustrates a first embodiment of the apparatus in a vertical section taken perpendicularly to the axis of the drum.

In a frame 1, a tube piece 2 (FIG. 2) is disposed with a horizontal axis, in which by means of two anti-friction bearings 3 the shaft 4 of a drum 5 is bearingly supported. The drum 5 is driven for a continuous rotation by means of a motor 6 (FIG. 1) having an adjustable gearing means 7. For this purpose, a pinion 9 is keyed to a driven shaft 8 of the gearing means 7. The pinion drives a toothed disc 11 which is keyed to the shaft 4 of the drum 5 by means of a chain 10 (FIG. 2). The drum is provided on its circumference with a plurality of receiving openings 12 having a hexagonal cross section, which openings are disposed in a plurality of rows extending parallel to the axis of the drum. In the preferred embodiment, there are six rows with two openings 12 each, which are spaced apart from each other in equal distances measured in the peripheral direction of the drum 5. Dough fed through a hopper 14 is pressed on a portioning location 13 (FIG. 1) into the receiving openings 12. For this a pressing-in-member 15 is provided which is fixed against rotation to a shaft 16 bearingly supported for rotation in the frame 1. A swivelling lever 17 is fixed to the shaft 16 and is provided with an elongated slot 18 in which a pinion 19 of a double lever 20 slides. The double lever is pivotally supported in the frame 1 around a pivot 21 and on its other end is pivotally connected to a connecting rod 22 which in turn is pivotally connected to a crank 23 fixed to the driven shaft 8 of the motor 6. The pressing-in-member 15 executes a rhythmical pivotal movement around the axis of the shaft 16 by which movement dough is pressed through an opening 24 into the receiving openings 12 passing the portioning location 13. A shearing edge 25 is provided to strip off the excess dough, and is disposed on an exchangeable gland 26, preferably constructed of synthetic plastic material, which can be pulled out of the frame 1 sidewise in order to facilitate cleaning.

Figure 2:
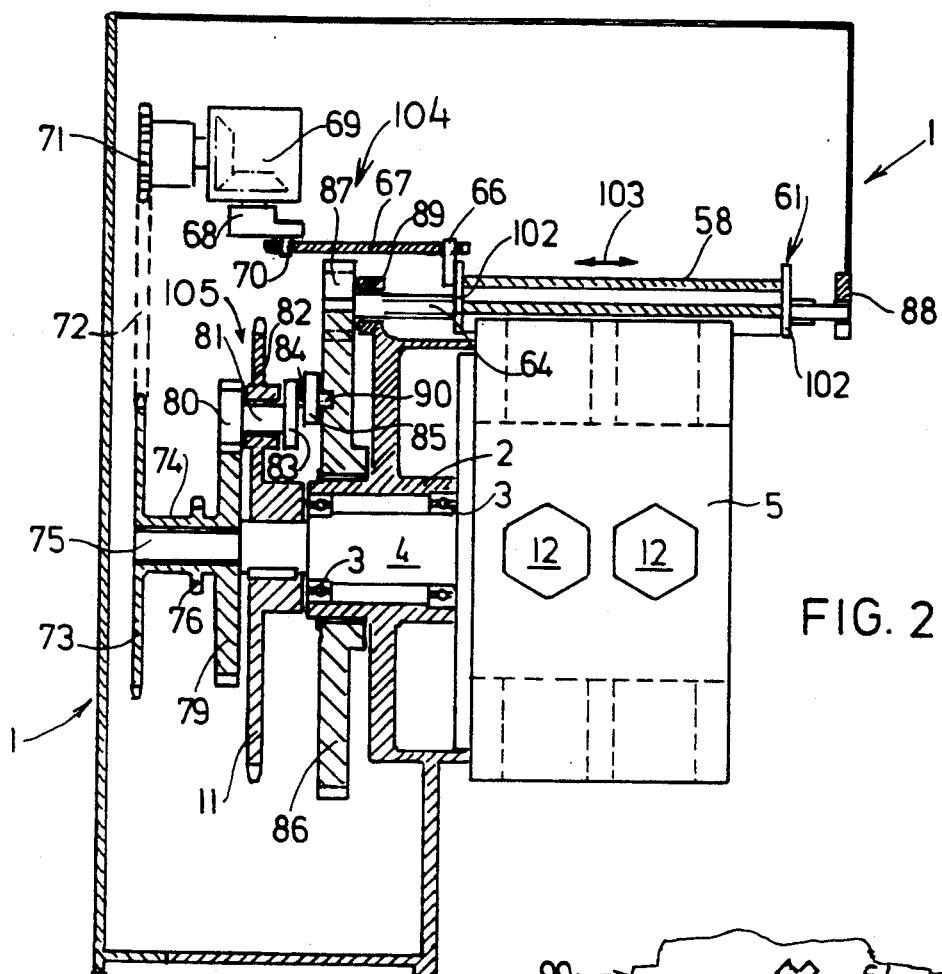
FIG. 2 illustrates an alternate embodiment of the invention, in section, taken through the axis of the drum.

As can be seen from FIG. 1, the portioning location 13 is disposed on that side of the drum 5 on which the receiving openings 12 move upwardly, because the drum 5 rotates in a direction indicated by arrow 27. In the region of the summit of the drum 5, a kneading location 28 is disposed in which the dough pieces disposed in the receiving openings 12 are subjected to a kneading operation, and on the side of the drum 5 opposite the portioning location 13 a laying-off location 29 is disposed at which the dough pieces from the receiving openings 12 are laid on a conveyer belt 30 which travels in the direction indicated by arrow 31.

A piston 32 is provided in each receiving opening 12 which is reciprocable in the respective receiving opening 12 in a radial direction relative to the drum 5. Each piston 32 is hinged on its side facing the axis of the drum to a strap 33 (FIG. 3) which on its inner end carries a roller 34 disposed in a rotating groove 35 of a cam disc 36 adjustably disposed within the drum 5. Further, the inner end of each strap 33 is hinged to a further strap 37 hinged to the drum 5 by means of a pin 38. Thereby for each piston 32 such a position within its receiving opening 12 is achieved which is defined by the distance of that place of the groove 35 from the axis of the drum 5, at which place the respective roller 34 is disposed. This distance changes during rotation of the drum 5 because the groove 35 is curved, for example, as follows. On the portioning location 13 (FIG. 1) the piston 32 is retracted in the receiving opening 12 in order to make room for the dough pressed by the pressing-in-member 15 into the receiving opening 12. The distance for which the piston 32 is retracted defines the volume of the dough piece portioned at the portioning location 13 per receiving opening 12. During further rotation of the drum 5 the piston 32 remains substantially in its retracted position until the respective receiving opening 12 reaches the region of the kneading location 28. Then, at the start of the kneading operation the piston 32 is slightly advanced in order to press the dough piece to be kneaded to a kneading tool 39 (FIG. 1) which will be described later in more detail. When the receiving opening 12 passes the kneading location 28, the piston 32 is continuously retracted in order to allow the dough piece in the receiving opening 12 to change to a ball-shaped configuration during the kneading process, which configuration requires more space. As soon as the receiving opening 12 has reached the laying-off location 29, the piston 32 is advanced to the circumference 40 of the drum 5 so that the completely kneaded dough piece is pushed out of the receiving opening 12 and is laid onto the conveyor belt 30. During the further rotation of the drum 5 the piston 32 remains at first in the advanced position until it is somewhat retracted in the region of the lower summit of the drum in order to make the inner wall of the receiving opening 12 ready for an effective flouring operation for which a flouring device 41 is disposed below the drum 5. The flouring device consists of a rotating brush 42 to which the flour is fed by means of a screw 43. The bristles of the brush touch an edge 44 of the housing and thereby throw the flour towards the passing receiving opening 12.

After having passed the flouring device 41, the receiving opening 12 again reaches the portioning location 13 and the cycle starts anew.

The corresponding shape of the groove 35 has been shown in FIG. 1 with dash and dot lines.

In order to change the weight of the portioned dough piece, the distance for which the piston 32 is retracted at the portioning location 13 is adjustable. For this purpose, the cam disc 36 is pivotally supported at a point 45 (FIG. 1) in the frame 1 and is connected by means of a hinge to a connecting rod 46, the other end thereof being connected by means of a hinge to a crank 47 pivotally beared in the frame 1, which crank can be adjusted by means of a screw drive 48 and a hand wheel 49.

An oiling device 50 can be provided in place of or in addition to the flouring device 41. The oiling device includes a pump for the oil to be supplied, which oil is sprayed from below towards the drum 5 by means of a nozzle.

Dough particles adhering to the circumference 40 of the drum 5 are stripped off by means of a brush bearingly supported in the frame 1 and driven for rotation.

For facilitating the transition of the completed kneaded dough piece onto the conveyer belt 30 the belt is guided near the drum 5 over a small guide roller 51 above which a press roller 52 rotatably bears on a lever 53, the inclination of which can be adjusted by means of an eccentric 54 so that the distance between the drum 5 and the press roller 52 can be adjusted. The press roller 52 is driven by means of a toothed belt 55 from a tensioning roller 56 disposed below the conveyer belt 30 which is guided over the circumference of the tensioning roller. A further roller 57 ensures a sufficiently large angle with which the conveyer belt 30 embraces the tensioning roller 56. The dough piece pushed off the receiving opening 12 is drawn off the drum 5 by the press roller 52.

The kneading tool 39 is formed by an endless band 58 which is guided over two guide rollers 59 and 60 spaced apart from each other a substantial distance (measured in the circumferential direction of the drum 5) and bearingly supported on a common carrier member 61 with their axes parallel to the axis of the drum. The carrier member is shiftably supported in the frame 1 in the direction of the axis of the shaft 4 of the drum 5. For this purpose the carrier member is provided on its edge disposed above the lay-off-location 29 with at least two rollers 62 running in a U-shaped guide rail 63 of the frame 1. Further, the carrier member 61 is slipped with its guide roller 60 shiftable in the same direction on a profiled shaft 64 formed as a shaft having a plurality of edges (FIGS. 1 and 2). The reciprocating shift of the carrier member 61 in the direction of the axis of the drum 5 is indicated by a double arrow 103 in FIG. 2. The shift is caused by a drive device 104, the carrier member 61 carrying a vertical plug 66 connected by means of a connecting rod 67 to an eccentric pin 70 of a crank 68 driven by means of a bevel wheel gear 69 from a sprocket wheel 71. The sprocket wheel 71 is driven by a chain 72 from a larger toothed disc 73 fixed to a sleeve 74 slipped for rotation on an elongation 75 of the shaft 4 of the drum 5 and carrying a sprocket wheel 76 driven by a chain 77 (FIG. 1) from a larger sprocket wheel 78 keyed to the driven shaft 8 of the adjustable gearing means 7 driven from the motor 6.

As a drive device 105 for the rotational movement of the profiled shaft 64, the sleeve 74 carries a pinion 79 on its end facing the drum 5, which pinion meshes with a small pinion 80 fixed to the one front end of a small shaft 81 bearingly supported for rotation in a flange 82 of the toothed disc 11 and carrying on its other end a crank 83. An eccentric pin 84 of the crank 83 is pivotably connected by means of a connection rod 85 to a driver 90 of a pinion 86 slipped for rotation on the tube piece 2. The pinion 86 meshes with a small pinion 87 fixed to the one front end of the profiled shaft 64, which end is bearingly supported in a flange 89 of the frame 1, whereas the other end of the profiled shaft 64 is bearingly supported for rotation in a bearing 88 of the frame 1. As already mentioned, the toothed disc 11 is driven from the motor 6 by means of the chain 10.

The profiled shaft 64 is driven to a rotational movement composed of two components: The one component is the rotational movement of the toothed disc 11 which by means of the driver 90 is transferred to the pinion 86 and thus to the profiled shaft 64. The other component is created by the rotational movement of the crank 83 which also by means of the driver 90 is transferred to the pinion 86 and causes a reciprocating movement of the pinion 86, which movement is superimposed to the mere rotational movement of the toothed disc 11. This reciprocating movement causes a continuous acceleration or, alternatively, slow down of the rotation of the small pinion 87 so that the profiled shaft 64 is driven with a periodically varying speed. The rotation of the profiled shaft 64 is composed with the reciprocating movement of the carrier member 61 in a direction of the double arrow 65 and created by the drive device 104 to a circular movement of the band 58 forming the kneading tool 39.

The drive component exerted over the toothed disc 11 to the profiled shaft 64 must by suitable selection of the gear ratio of the pinions be so chosen that the band 58 despite its circular kneading movement revolves with the same peripheral velocity as the circumference 40 of the drum 5. The amplitude and the speed of the circular kneading movement is chosen corresponding to the given circumstances. Changes of this movement are possible by changing the gear ratios of the drive devices 104 and 105 which act on the carrier member 61 or on the band 58 for the kneading movement.

Figure 3:
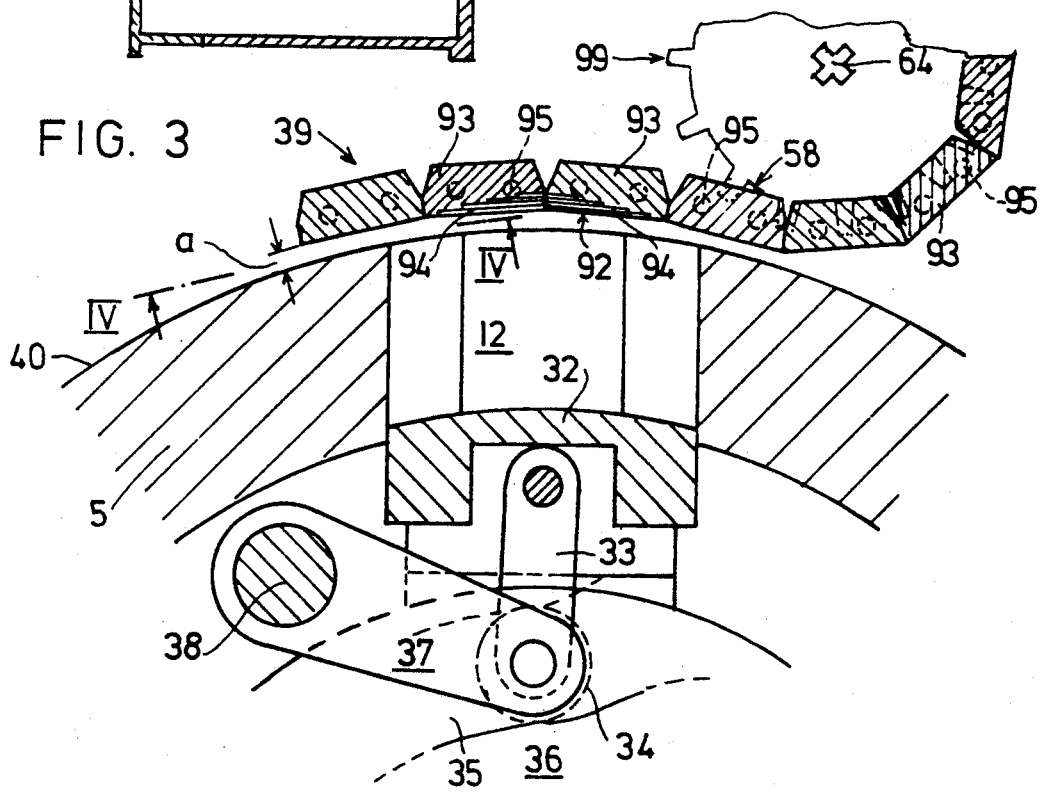
FIG. 3 is an enlarged scale view of the detail of the construction and guiding of the band formed as a linked band.

For carrying out the kneading process, the band 58 on its outer surface 91 facing the circumference 40 of the drum 5 has a plurality of recesses 92 (FIG. 3) spaced apart in equal distances from each other, the walls thereof are stepwisely shaped in order to ensure a good grip on the dough piece during the circular movement of the kneading tool 39. The recesses 92 may be worked into a continuous band, for example of synthetic plastic material, or, as shown in FIG. 3, the band may be composed of a plurality of plates 93 as an articulated band. Because the band 58 must be guided along the guide rollers 59 and 60, it is suitable to select the width of the plates 93, measured in a running direction, such that they are not too large in order to avoid difficulties when turning round the band. Because the recesses with their greatest diameter should not be much smaller than the largest transverse dimension of the receiving opening 12, it is suitable to divide the recesses 92 over two adjacent plates 93 each, if desired even over three or four such plates, each plate 93 having cut-outs 94 which are composed of a recess 92. Each plate 93 (FIGS. 3 and 4) is provided on both its front ends with two inserted pins 95 forming the link pins of an articulated chain 96 running together with the band 58 on the side edge 97 thereof and serving on the one hand as a drive for the band for the revolutionary movement thereof, and on the other hand as a guide means for the band 58 so that the band is kept at a predetermined distance a (FIGS. 1 and 3) from the circumference 40 of the drum 5. For this purpose, the articulated chain 96 forms a row of perforations 98, which perforations mesh with the teeth of a toothed wheel (FIGS. 3 and 4) forming a driving wheel 99 for the band 58, which toothed wheel 99 is driven for rotation in the rhythm of the profiled shaft 64. For this purpose, the toothed wheel 99 is fixedly secured against rotation to the profiled shaft 64 while, however, being displacable lengthwise thereof in order to allow a transverse shift of the carrier member 61 in which the toothed wheel 99 is disposed. As a result of this toothed wheel-drive, it is ensured that the band 58 always runs correctly with the drum 5 and that a receiving opening 12 is always disposed below a recess 92 to carry out the kneading process.

The guidance of the band 58 at the distance a spaced apart from the circumference of the drum is ensured by providing the pins 95 with protrusions 100 extending laterally beyond the articulated chain 96, which slide in a longitudinal groove 101 forming a link provided in a sidewall 102 of the carrier member 61 extending at the side of the band 58. Suitably such longitudinal grooves 101 form a guide means provided on both side edges 97 of the band 58.

After having passed the shearing edge 25, the dough piece pressed at the portioning location 13 into the receiving opening 12 is brought into a position below the kneading tool 39 which extends over a considerable section of the periphery of the drum 5, suitably over at least 45°, and preferably about 60° to 80°. Thereby a long time period is available for the kneading process so that perfectly kneaded dough portions are put onto the conveyer belt at the laying-off position 29. Very short cycle times can be achieved so that the apparatus has a high efficiency, for example 50 to 60 strokes per minute.

According to the embodiment illustrated in FIGS. 5 and 6, the drive means of the drum 5 is substantially the same as that of the embodiment according to FIGS. 1 to 4. A difference, however, is the construction of the drive device 104 for the reciprocating movement of the carrier member 61 in the direction of the double arrow 103 and the drive device 105 for the rotational movement of the profiled shaft 64 to which movement of an oscillating component is superimposed which is in synchronism with the reciprocating movement of the carrier member 61. Both drive devices 104 and 105 are energized by a common motor 106 disposed within the frame 1 which drives the bevel wheel gear 69. From the driven shaft thereof the reciprocating movement of the carrier member 61 in the direction of the double arrow 103 is achieved by means of the crank 68, the eccentric pin 70 and the connecting rod 67 as described in connection with the embodiment according to FIGS. 1 to 4. However, one end of a further connecting rod 107 is articulated to the eccentric pin 70, while the other end thereof is articulated to the pin 108 fixed on an oscillating arm 109 disposed for free rotation on an elongation 110 of the profiled shaft 64, which elongation has the shape of a round bar (FIG. 6). Three sprocket wheels 111, 112 and 113 are bearingly supported for rotation on the oscillating arm 109, over which wheels a chain 114 is guided such that it embraces the upper peripheral section of the two outer sprocket wheels 111 and 113 and the lower peripheral section of the central sprocket wheel 112. The chain 114 is driven from a drive sprocket wheel 115 fixed to the driven shaft of the motor 6 and disposed coaxially to the pinion 9. The central sprocket wheel 112 is secured for rotation with the elongation 110 of the profiled shaft 64. The constant component of the rotational movement of the profiled shaft 64, therefore, is done by means of the chain 114, and the oscillating component superimposed over this component is done by means of the oscillating arm 109, because the two outer sprocket wheels 111 and 113, forming guide sprocket wheels, are driven as such with a continuous angular velocity by the drive sprocket wheel 115 for moving the band 58 in the direction of the periphery of the drum 5, however, to this movement the oscillating movement of the oscillating arm 109 is superimposed, which movement is transformed into an oscillating drive movement of the central sprocket wheel 112 and, therefore, of the profiled shaft 64.

The drum 5 is driven from the driven shaft 8 of the motor 6 via the pinion 9, the chain 10, and the toothed disc 11 keyed to the shaft 4 of the drum. The ratios of the diameters of the sprocket wheels 9, 11, 115 and 112 must be so coordinated that, when the drum 5 rotates, a recess 92 is always disposed above a receiving opening 12 for carrying out the kneading process.

The motor 106 may be operated with variable speed of its driven shaft or the bevel wheel gear 69 may be an adjustable-speed gear drive. Thereby the number of revolutions of the kneading tool or, respectively, of the recesses 92 of the kneading band 58 which act on the dough piece disposed within the receiving opening 12 during the kneading process, may be varied.

As shown in FIG. 7, the band 58 can also be a toothed belt provided with drivers for ensuring its drive movement in the direction of the periphery of the drum 5. In the exemplary embodiment shown, these drivers are formed by a row of perforations 116 disposed at the edge of the band 58, and meshing with teeth 117 fixed either directly to the guide roller 60 or to the pinion forming the driving wheel 99 and secured for rotation with the guide roller 60 or, respectively, with the profiled shaft 64. Instead of the row of perforations 116 and the teeth 117 a suitable corrugation of the band 58 or of the guide roller 60 may be used. Such bands 58 may be easily formed as textiled belts, preferably of synthetic plastic material.

For relatively large applications it would be possible to provide more than four rows, for example, six rows of receiving openings 12 divided over the periphery of the drum 5.

I claim:

1. An apparatus for kneading portioned dough pieces comprising:
a frame;
a drum rotatably mounted to said frame, said drum having an axis of rotation and a substantially circular peripheral surface, said substantially circular peripheral surface having a first plurality of spaced apart cavities for receiving said portioned dough pieces, each of said cavities being spaced apart a first predetermined distance and having a central axis coaxial with a radius of said substantially circular peripheral surface;

first drive means for rotating said drum about said axis of rotation in a first predetermined direction;

a carrier member mounted adjacent to said frame in spaced relationship to a portion of said substantially circular peripheral surface of said drum;

first and second guide members mounted to said carrier member, said first guide member being spaced apart from said second guide member a second predetermined distance along said portion of said substantially circular peripheral surface of said drum;

a kneading band rotatably mounted to said first and second guide members;

said kneading band having an outer surface with a second plurality of spaced apart cavities therein, at least one cavity of said second plurality of spaced apart cavities on said kneading band corresponding to and being complementary with any one of said first plurality of spaced apart cavities on said substantially circular peripheral surface of said drum; and means for circularly orbiting said at least one cavity of said second plurality of spaced apart cavities of said kneading band about said central axis of each respective cavity of said first plurality of spaced apart cavities of said drum, said means for circularly orbiting said at least one cavity of said second plurality of spaced apart cavities comprising second drive means for rotating said kneading band on said first and second guide members in a direction substantially parallel to said first predetermined direction of rotation of said drum about said axis of rotation such that when a portioned dough piece is placed in any one cavity of said first plurality of spaced apart cavities of said drum and said first drive means moves said drum in said first predetermined direction towards said kneading band, said second drive means will move said kneading band substantially parallel to said first predetermined direction along said second predetermined distance of said portion of said substantially circular peripheral surface and said at least one cavity of said second plurality of spaced apart cavities will be complemented by said any one cavity of said first plurality of spaced apart cavities and said means for circularly orbiting said at least one cavity of said second plurality of spaced apart cavities will knead said portioned dough pieces as any one cavity of said first plurality of spaced apart cavities travels along a portion of said substantially circular peripheral surface of said drum.

2. The apparatus according to claim 1, wherein said carrier member is disposed above said drum.

3. The apparatus according to claim 1, wherein said first and second guide members are guide pulleys rotatably mounted to said carrier member.

4. The apparatus according to claim 1, wherein said second drive means for rotating said kneading band imparts a reciprocating movement to said kneading band as said kneading band moves along said second predetermined distance along said direction of rotation of said drum, whereby said rotary motion of said second drive means and said reciprocating movement result in a circular orbiting movement of said at least one cavity of said second plurality of spaced apart cavities of said kneading band.

5. The apparatus according to claim 4, wherein said second drive means for reciprocating said carrier member comprises an eccentric pin connected to said carrier member by a connecting rod, said eccentric pin being driven by a motor.

6. The apparatus according to claim 5, wherein said drum is rotatably supported by said frame on a shaft and wherein said second drive means for reciprocating said carrier member further comprises:

a sleeve coaxially disposed with said shaft of said motor and driven thereby;

a first pinion mounted to said sleeve; and a toothed disc rotatably carried by said shaft for complementary rotation with said first pinion.

7. The apparatus according to claim 4, wherein said second drive means for rotating said kneading band further comprises:

a swivel arm swivellably connected to said carrier member for superimposing said circular orbiting motion upon said kneading band while said kneading band is rotated; and a drive wheel mounted coaxial with said swivel arm for driving said kneading band along said first predetermined direction of rotation of said drum, said swivel arm being synchronized with said second drive means for reciprocating said carrier member.

8. The apparatus according to claim 7, wherein said swivel arm is synchronized with said second drive means for reciprocating said carrier member and further comprises a connecting rod having one end connected to said swivel arm and an eccentric pin connected to the opposite end of said connecting rod for rotary movement therewith.

9. The apparatus according to claim 8, further comprising a motor to drive said eccentric pin and wherein said motor also serves to reciprocate said carrier member.

10. The apparatus according to claim 1, wherein said second drive means for rotating said kneading band further comprises a driving wheel rotatably attached to said carrier member.

11. The apparatus according to claim 10, wherein said driving wheel is disposed coaxially to one of said first and second guide members and driven thereby.

12. The apparatus according to claim 1, further comprising guide means for guiding said kneading band in spaced apart relation from said circular peripheral surface of said drum.

13. The apparatus according to claim 12, wherein said guide means comprises a chain attached to an edge of said kneading band and a groove disposed in said carrier member, said chain having a plurality of lateral protrusions engaging said groove for guiding said kneading band in spaced apart relation from said circular peripheral surface of said drum.

14. The apparatus according to claim 1, wherein said second predetermined distance is a distance no less than said first predetermined distance.

15. The apparatus according to claim 14, wherein said kneading band extends along at least a 45 degree arc along said substantially circular peripheral surface of said drum.

16. The apparatus according to claim 1, further comprising:

a shaft mounted coaxially with said axis of rotation of said drum;

a profiled shaft mounted to said frame substantially parallel to said axis of rotation of said drum and coupled to said second drive means for rotating said kneading band; and wherein said carrier member is slidably guided on said profiled shaft, said profiled shaft transmitting rotative motion to said second drive means and said kneading band.

17. The apparatus according to claim 16, further comprising roller elements disposed between said carrier member and said frame and wherein said carrier member is slidably supported at one end by said profiled shaft and at an oppositely disposed end by said roller elements.

18. The apparatus according to claim 16, wherein said second drive means for rotating said kneading band comprises:

a first pinion mounted rotatably coaxial with said shaft of said drum;

a second pinion mounted to said profiled shaft, said second pinion meshing with said first pinion, said second pinion further having coupling means for coupling said second pinion to a disc which is driven by said first drive means for driving said drum, said coupling means comprising a driver rotatably engaging said second pinion; a connecting rod engaging said driver;

an eccentric pin having one end engaging said connecting rod;

a crank having a central axis mounted parallel to said axis of rotation of said drum and mounted contiguous said eccentric pin; and said opposite end of said eccentric pin being attached to said crank.

19. The apparatus according to claim 18, wherein said second drive means further comprises a second pinion mounted contiguous said first pinion wherein said crank is coupled to said second pinion and further wherein said second pinion connected to said crank meshes with said first pinion and is driven by said second drive means for the reciprocating movement of said carrier member.

20. The apparatus according to claim 1, wherein said kneading band is a link band comprising a plurality of plates, said plurality of plates having said plurality of spaced apart cavities formed on one side thereof.

21. The apparatus according to claim 20, wherein each said cavity of said plurality of cavities is formed by cut-outs defined in more than one plate.

22. The apparatus according to claim 1, wherein said kneading band is a textile belt provided with said plurality of cavities, said textile belt having a perforation row for engaging said second drive means for rotating said kneading band.

* * * * *